(12) United States Patent
Kopp et al.

(10) Patent No.: US 7,463,800 B2
(45) Date of Patent: Dec. 9, 2008

(54) CHIRAL FIBER GRATING DEVICE AND METHOD OF FABRICATION THEREOF

(75) Inventors: Victor Il'ich Kopp, Flushing, NY (US); Azriel Zelig Genack, New York, NY (US); Guoyin Zhang, Clifton, NJ (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 11/646,130

(22) Filed: Dec. 27, 2006

(65) Prior Publication Data

US 2007/0147736 A1 Jun. 28, 2007

Related U.S. Application Data

(60) Provisional application No. 60/754,591, filed on Dec. 27, 2005.

(51) Int. Cl.
*G02B 6/34* (2006.01)
(52) U.S. Cl. ........................................... 385/37
(58) Field of Classification Search .................... 385/37
See application file for complete search history.

(56) References Cited

U.S. PATENT DOCUMENTS

2002/0071881 A1* 6/2002 Kopp et al. .................. 425/66
2002/0131707 A1* 9/2002 Kopp et al. .................. 385/37

* cited by examiner

*Primary Examiner*—Hemang Sanghavi
*Assistant Examiner*—Kajli Prince
(74) *Attorney, Agent, or Firm*—Edward Etkin, Esq.

(57) ABSTRACT

A chiral fiber grating for reflecting, scattering or polarizing an optical signal, or for forming a fiber laser feedback structure is disclosed. The chiral fiber grating is fabricated by fusing and then twisting/drawing two tapered optical fibers in accordance with a predetermined fabrication protocol. In one embodiment of the invention, the chiral fiber grating includes two single helix structure end-regions, with a double helix structure therebetween, providing the grating with apodizing properties. In another embodiment of invention, the pitch profile along a portion of the grating is configured to produce desired chiral fiber grating properties. In yet another embodiment of the invention, the chiral fiber grating, comprising two single helix end regions and a middle double helix region, may be separated into two or more portions after fabrication, for example to provide one or more single helix chiral fiber gratings and one or more double helix chiral fiber gratings. In an alternate embodiment of the invention, a double helix structure chiral fiber grating is provided by twisting two parallel optical fibers around a longitudinal central axis positioned therebetween.

7 Claims, 2 Drawing Sheets

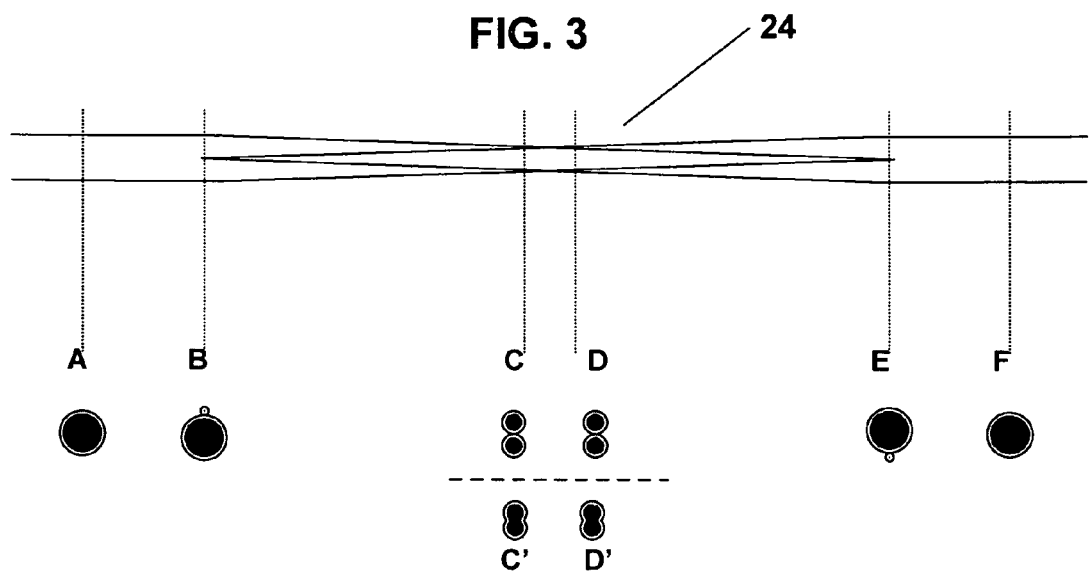
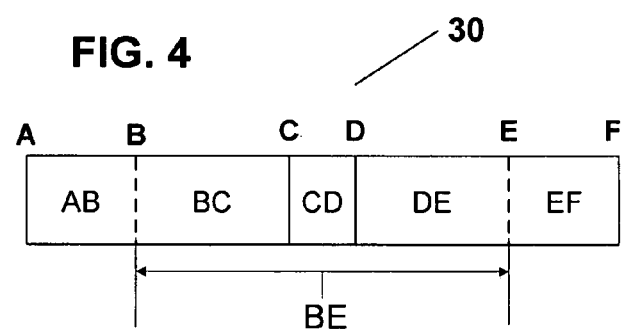
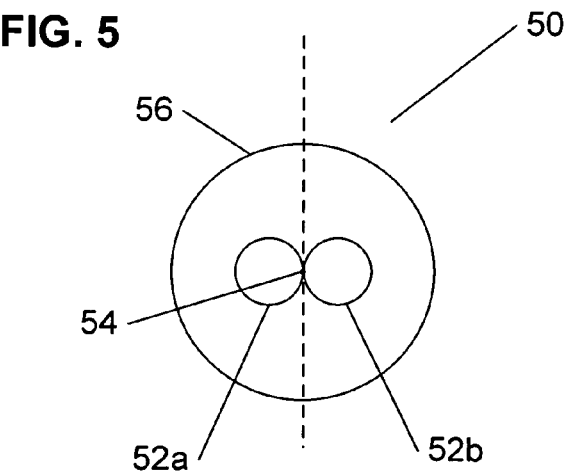

CHIRAL FIBER GRATING DEVICE AND METHOD OF FABRICATION THEREOF

CROSS REFERENCE TO RELATED APPLICATIONS

The present patent application claims priority from the commonly assigned provisional patent application Ser. No. 60/754,591 entitled "Chiral Fiber Grating Device and Method of Fabrication Thereof", filed Dec. 27, 2005.

FIELD OF THE INVENTION

The present invention generally relates to fiber grating structures, and a method of manufacturing thereof, for utilization as dielectric waveguides for signal generation and processing, and more particularly to an optical fiber grating having chiral properties that is fabricated fusing and then twisting two optical fibers under a predetermined fabrication protocol.

BACKGROUND OF THE INVENTION

Fiber gratings are incorporated into components that form the backbone of modern information and communications technologies, and are suitable for a wide range of applications, such as information processing and optical fiber communication systems utilizing wavelength division multiplexing (WDM). There are many different fiber grating types and configurations. For example, fiber Bragg gratings are one dimensional periodic structures that are useful in lasing, filtering and sensing applications. Various Bragg grating configurations also include chirped fiber gratings useful in chromatic dispersion compensators and apodized fiber gratings that are used to eliminate sidelobes in signal transmission spectra.

The conventional method of manufacturing fiber gratings is based on photo-induced changes of the refractive index. Extended lengths of periodic fiber are produced by moving the fiber and re-exposing it to the illumination while carefully aligning the position to be in phase with the previously written periodic modulation. The fiber core utilized in the process must be composed of specially prepared photosensitive glass, such as germanium doped silicate glass. This approach limits the length of the resulting grating and also limits the produced index contrast. Furthermore, such equipment requires perfect alignment of the lasers and exact coordination of the fiber over minute distances when it is displaced prior to being exposed again to the laser beam.

A variety of revolutionary fiber gratings based on chiral fiber structures have been developed to address the drawbacks of previously known fiber gratings as well as to offer new functionality. These fiber gratings are disclosed in a commonly assigned co-pending U.S. Patent Application entitled "Customizable Chirped Chiral Fiber Bragg Grating" as well as in commonly assigned U.S. Pat. No. 6,839,486, entitled "Chiral Fiber Grating", U.S. Pat. No. 6,741,631, entitled "Customizable Apodized Chiral Fiber Grating Apparatus and Method", and U.S. Pat. No. 6,925,230, entitled "Long Period Chiral Fiber Grating Apparatus", (hereinafter individually and collectively referred to as "Chiral Fiber Patents") all of which are hereby incorporated by reference herein in their entirety.

The Chiral Fiber Patents focused on implementation of fiber grating products in form of chiral fiber structures having double helix symmetry (which resulted in the chiral fibers having properties similar to cholesteric liquid crystals, and thus being polarization sensitive). In addition, the Chiral Fiber Patents also disclosed a single helix chiral fiber configuration for use in fiber grating applications where polarization sensitivity is not necessary.

Various advantageous techniques for fabrication of various configurations of chiral fiber gratings (for example such as disclosed in the above-incorporated Chiral Fiber Patents) via twisting (and drawing, where applicable) are disclosed in commonly assigned co-pending U.S. Patent Applications entitled "Apparatus and Method for Manufacturing Periodic Grating Optical Fibers", "Apparatus and Method of Manufacturing Chiral Fiber Bragg Gratings", and "Apparatus and Method for Manufacturing Helical Fiber Bragg Gratings", (hereinafter individually and collectively referred to as "Chiral Fiber Fabrication (CFF) Patent Applications") which are all incorporated by reference herein in their entirety.

However, one of the challenges of fabricating chiral fiber gratings in accordance with the CFF Patent Applications, is preparation of proper optical fiber preforms used in fabrication of the gratings. For example, custom optical fiber preforms may be required for optimal results. Another challenge rests in fabrication of certain types of chiral fiber gratings, for example those with properties. Such gratings require twist and drawing fabrication protocols that vary during the fabrication process, and thus cause additional stress on the fiber increasing the likelihood that a custom preform may be ruined. In addition, because preforms are pre-selected for fabrication of a chiral fiber grating with a specific helical structure (i.e., single or double), a separate fabrication process is necessary for manufacturing each type of chiral fiber gratings.

It would thus be desirable to provide an advantageous method for fabricating single and double helical structure chiral fiber gratings without using custom preforms. It would also be desirable to provide a chiral fiber grating with single helix structure waveguide end-portions and a double helix structure middle portion, having apodizing properties. It would also be desirable to provide a method of fabricating chiral fiber gratings of both single helix and double helix configuration during a single continuous fabrication process.

SUMMARY OF THE INVENTION

The purpose of the present invention is to provide a custom chiral fiber grating for reflecting, scattering or polarizing an optical signal or for forming a fiber laser feedback structure and a novel method of fabrication thereof. By use of the inventive fabrication process methodology, the custom chiral fiber grating is fabricated by fusing, and then twisting/drawing two tapered optical fibers in accordance with a predetermined fabrication protocol.

In one embodiment of the invention, the chiral fiber grating includes two single helix structure end-regions, with a double helix structure therebetween, providing the grating with apodizing properties. In another embodiment of invention, the pitch profile along a portion of the chiral fiber grating is configured to produce specific desired chiral fiber grating properties. In yet another embodiment of the invention, the fabricated chiral fiber grating comprising two single helix end regions and a middle double helix region, may be separated into two or more portions after fabrication, for example to provide one or more single helix chiral fiber gratings, and one or more double helix chiral fiber gratings as a result of a continuous fabrication process. In an alternate embodiment of the invention, a double helix structure chiral fiber grating may be fabricated by twisting two parallel optical fibers around a longitudinal central axis positioned therebetween.

The following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

In the drawings, wherein like reference characters denote elements throughout the several views:

FIG. 3 is a schematic diagram of a side view of the first exemplary embodiment of the fiber structure from which the inventive chiral fiber grating is fabricated;

FIG. 4 is a schematic diagram of a side view of the first exemplary embodiment of the chiral fiber grating of the present invention after fabrication thereof; and FIG. 5 is a schematic diagram of a cross-section view of a second exemplary embodiment of the chiral fiber grating of the present invention.

DETAILED DESCRIPTION OF PREFERRED EMBODIMENTS

The present invention is directed to a custom chiral fiber grating for reflecting, scattering or polarizing an optical signal or for forming a fiber laser feedback structure, and an advantageous method of fabrication thereof. In essence, the inventive chiral fiber grating is fabricated by fusing and then twisting/drawing two tapered optical fibers in accordance with a predetermined fabrication protocol. In one embodiment of the invention, the chiral fiber grating includes two single helix structure end-regions, with a double helix structure therebetween, providing the grating with apodizing properties. In another embodiment of invention, the pitch profile along a portion of the grating is configured to produce desired chiral fiber grating properties. In yet another embodiment of the invention, the chiral fiber grating comprising two single helix end regions and a middle double helix region may be separated into two or more portions after fabrication, for example to provide one or more single helix chiral fiber gratings and one or more double helix chiral fiber gratings. In an alternate embodiment of the invention, a double helix structure chiral fiber grating may be fabricated by twisting two parallel optical fibers around a longitudinal central axis positioned therebetween.

Before describing the present invention in greater detail, it should be noted that any of the chiral fiber fabrication technologies disclosed in the above-incorporated CFF Patent Applications may readily be utilized in conjunction with the present invention to produce the desired chiral fiber gratings. However, other techniques for twisting optical fibers may be readily adapted for use with the inventive method of the present invention without departing from the spirit thereof.

Figure 1A:
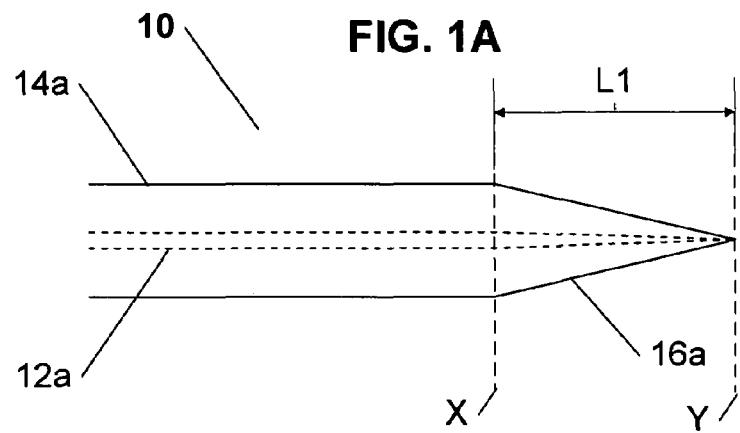
FIGS. 1A and 1B are schematic diagrams of a side view of preforms utilized to fabricate a chiral fiber grating in a first exemplary embodiment of the present invention.
Figure 1B:
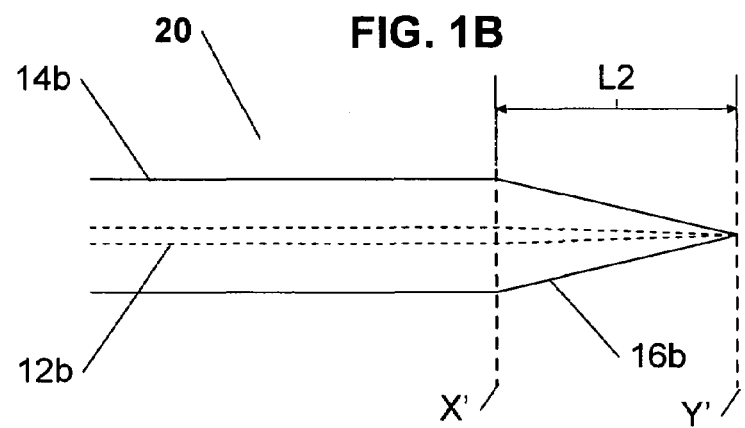

Referring now to FIGS. 1A-1B, according to a first exemplary embodiment of the present invention, in the first step of fabricating the inventive chiral fiber grating, a conventional single mode optical fiber 10, having a fiber core 12a and a fiber cladding 14a, is tapered down (in a region 16a) over a length L1 to a diameter at which the core 12a does not guide the light and the cladding 14a acts as a waveguide, as shown in FIG. 1A. The tapering profile of the taper region 16a between cross-sections X and Y may be configured as matter of design choice without departing from the spirit of the invention. For example, the tapering profile may be straight (as in FIG. 1A), or it may be configured in accordance with a mathematical function, randomly, and/or may include multiple stages of tapering with sections of constant diameter therebetween (not shown), as long at the cross section Y, the core 12a does not guide light and the cladding 14a acts as a waveguide.

A second tapered fiber 20 is also provided as shown in FIG. 1B. The tapered fiber 20 and its components—a core 12b, a cladding 14b, a tapered region 16b (tapered over a length L2), may be substantially similar or identical to the corresponding components of the tapered fiber 10. Alternately, the tapered fiber 20, may have different properties, such as a different taper profile in its taper region 16b, than the taper profile of the taper region 16a of the tapered fiber 10, depending on the desired configuration of the final chiral fiber grating to be produced utilizing the novel fabrication method.

Figure 2:
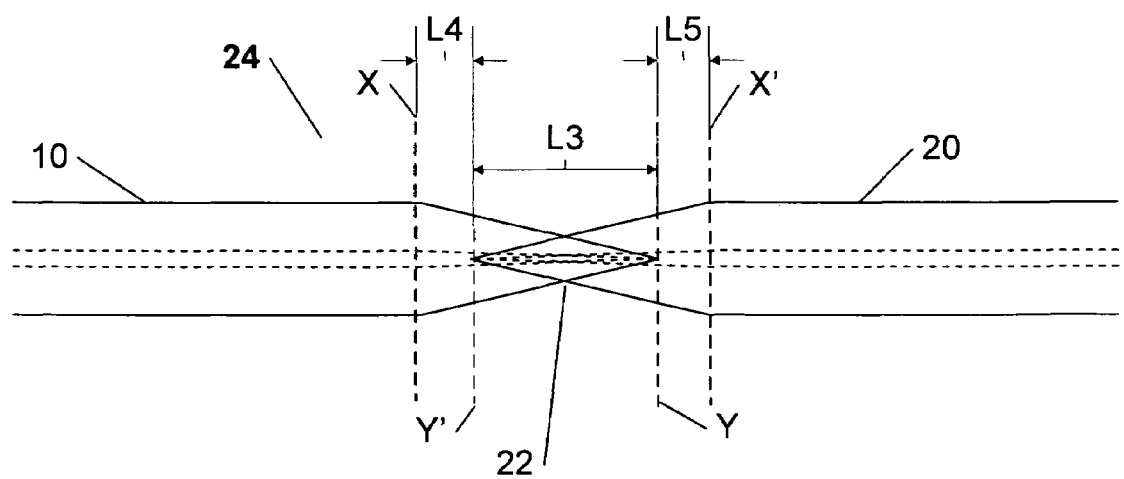
FIG. 2 is a schematic diagram of a side view of two preforms of FIG. 1, prepared for fabrication of the chiral fiber grating in the first exemplary embodiment of the present invention.

Referring now to FIG. 2, at the second step, the two tapered fibers 10, and 20 are overlapped as shown in FIG. 2, and then attached to one another in such a manner that at least a portion of their taper regions 16a and 16b overlap (for example, by being fused) in an overlap region 22 to produce a fiber structure 24. A length L3 of the overlap region 22 may be larger or smaller than the length L1 and L2 of each corresponding taper regions 16a and 16b, respectively, without departing from the spirit of the invention. Thus, as shown in FIG. 2, the distance L4 between X and Y', and the distance L5 between Y and X' may be selected as a matter of design choice. In one embodiment of the invention, when the fibers 10, 20 are attached to one another via fusing, this second step of the inventive method may involve the process of drawing and twisting of the fibers 10, 20 in order to properly fuse them.

In accordance with the present invention, and as discussed above in connection with FIG. 2, the fibers 10, 20 are preferably attached to one another in such a manner as to produce the fiber structure 24, as shown in FIG. 3. Thus, if attachment of fibers 10, 20 is via fusing, the drawing and twisting of the fibers 10, 20 may be repeated until the needed fiber structure 24 is achieved.

Referring to FIG. 3, in fiber structure 24, the fiber cross-section and its birefringence changes along the length of the structure 24 from a cross-section A to a cross-section F. At the cross-section A, the fiber structure 24 is circular and is not birefringent. At a cross-section B, the fiber structure 24, serving as a waveguide, consists of two fibers 10, 20 of very different diameters, and is slightly birefringent. The portion of the fiber between cross sections C and D has the largest birefringence and is composed of two fibers 10, 20 of substantially equal diameters. The distance between cross sections C and D (distance CD) is likely very small, so there is only one point along the waveguide, which has the cross-section C. The cross-sections E and F and the structure therebetween, are substantially similar in configuration to cross sections B and A respectively.

In the third step, after the fiber structure 24 is formed as shown in FIG. 3, the structure 24 is further drawn and twisted into a resulting chiral fiber grating 30 shown in FIG. 4, along with the various sections thereof, corresponding to the regions between various cross-sections A-F of the fiber structure 24 shown in FIG. 3.

In the preferred embodiment of the invention, the chiral fiber grating 30 diameter at the cross-section A corresponds to a single-mode fiber diameter. If the resulting chiral fiber grating is to have reflective or Bragg grating properties, the final helical pitch is equal to the optical wavelength inside the chiral fiber grating 30, and twist acceleration and deceleration (as described in the above incorporated CFF Patent Applications) are produced in the section AB and EF, respectively, so that the fiber structure 24 is substantially uniformly twisted along a section BE of the fiber grating 30.

The fiber geometry of the chiral fiber grating 30 of the present invention has two advantages as compared to chiral structures previously disclosed in the above-incorporated Chiral Grating Patents. First, the optical signal can be freely transmitted through the twist acceleration section (AB, EF), as the twist acceleration is in the circular, non-birefringent portion of the fiber grating 30. Second, the grating 30 is automatically apodized, which affords the possibility to control the spectral shape of the reflection band. The chiral grating 30 is apodized because its strength is proportional to the birefringence of the waveguide, which is maximal in the middle of the structure (i.e., in the section CD) and substantially reduced closer to its ends. In accordance with the present invention, the fiber cross-sections in the section CD may not be uniform, and for example may be deformed as shown by section C'D' in FIG. 3.

The pitch profile along the section BE may be optimized to produce the desired device performance, such as choosing a laser mode in the case of fiber laser, or a desired spectral shape in the case of a fiber filter. If a polarizing grating is desired, the final pitch may be much larger than the optical wavelength, and twist acceleration need not be confined by the section AB.

One particularly advantageous feature of the present invention is that the optical fibers 10, 20 used to fabricate the structure 24, and then the resulting chiral fiber grating 30, may be standard, conventional single mode optical fibers, so that the inventive method of manufacturing the grating 30, does not require use of a complex custom-made fiber preform.

Because the regions BC and DE of the fiber structure 24 comprise proximal fibers of different diameters that are asymmetrical to the longitudinal central axis of the structure 24, after fabrication in accordance with the third step of the inventive method, the sections BC and DE of the fiber grating 30, are essentially single helix structures. While in one embodiment of the invention (as described above), they may be used as waveguides for entry to and exit from the double helix structure section CD, in an alternate embodiment of the invention, one or both sections BC and DE may be detached from the section CD after the grating 30 is fabricated to, produce one or two separate single helix fiber gratings and a double helix fiber grating (in section CD).

In another embodiment of the present invention, multiple optical fibers tapered at each of their ends (rather than just one end as shown in FIGS. 1A and 1B) may be used, and attached sequentially between the fibers 10 and 20, and their taper regions attached to one another (as shown in FIG. 2), so that a greater number of desirable chiral fiber gratings may be fabricated during a single fabrication process by separating the desired sections of the resulting chiral fiber grating to produce multiple units of the grating 30 (or portions thereof).

Referring now to FIG. 5, in yet another embodiment of the present invention, a double helix chiral fiber grating 50 can be fabricated by utilizing two identical fiber cores 52a and 52b, symmetrically positioned with a longitudinal axis 54 of the grating 50 therebetween, and then twisted about the axis 54.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method of fabricating a chiral fiber grating, having a central longitudinal axis, comprising the steps of:
   (a) providing a first optical fiber having a first lengthwise uniform region, and a first lengthwise generally tapered region, and providing a second optical fiber having a second lengthwise uniform region, and a second lengthwise generally tapered region;
   (b) attaching said first and second tapered regions to one another, to form a fiber preform structure having a first and a second end, and a central region, such that said first uniform region is positioned at said first end, said second uniform region is positioned at said second end, and at least a portion of said first and second tapered regions overlap with one another in said central region to form an overlap region; and
   (c) producing the chiral fiber grating by applying a predetermined fabrication protocol to said fiber preform structure, to produce a plurality of regions of different grating strength along the chiral fiber grating, each corresponding to each of: said first and second uniform regions, said overlap region, and portions of said first and second tapered regions outside said overlap region of said fiber preform structure.

2. The method of claim 1, wherein said predetermined fabrication protocol comprises the step of:
   (d) twisting and drawing said fiber preform structure to produce apodizing properties along the chiral fiber grating.

3. A chiral fiber grating, produced in accordance with the method of claim 1, comprising a first portion configured as first single helix structure, a central sequential portion configured as a double helix structure, and a second sequential portion configured as a second single helix structure.

4. The chiral fiber grating of claim 3, wherein said first and said second single helix structures have substantially similar properties.

5. The chiral fiber grating of claim 3, wherein said first and said second single helix structures have different properties.

6. The method of claim 1, comprising the step of:
   (e) after said step (c) separating at least one portion of the chiral fiber grating to form a corresponding separate chiral fiber grating structure based on a birefringence profile therein.

7. The method of claim 1, wherein each of said first and second tapered regions is formed in accordance with a corresponding first and second taper profile.

* * * * *